L. H. DEBS.
PAN AND METHOD OF MAKING THE SAME.
APPLICATION FILED OCT. 4, 1921.

1,438,698.

Patented Dec. 12, 1922.
3 SHEETS—SHEET 1.

Inventor,
Louis H. Debs,
By Byrenforth, Lee Chritton Wiles
Attys.

L. H. DEBS.
PAN AND METHOD OF MAKING THE SAME.
APPLICATION FILED OCT. 4, 1921.

1,438,698.

Patented Dec. 12, 1922.
3 SHEETS—SHEET 2.

Inventor,
Louis H. Debs,

L. H. DEBS.
PAN AND METHOD OF MAKING THE SAME.
APPLICATION FILED OCT. 4, 1921.
1,438,698.
Patented Dec. 12, 1922.
3 SHEETS—SHEET 3.
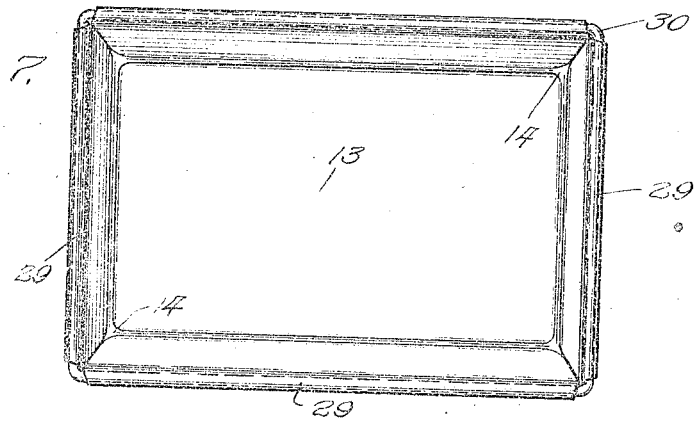
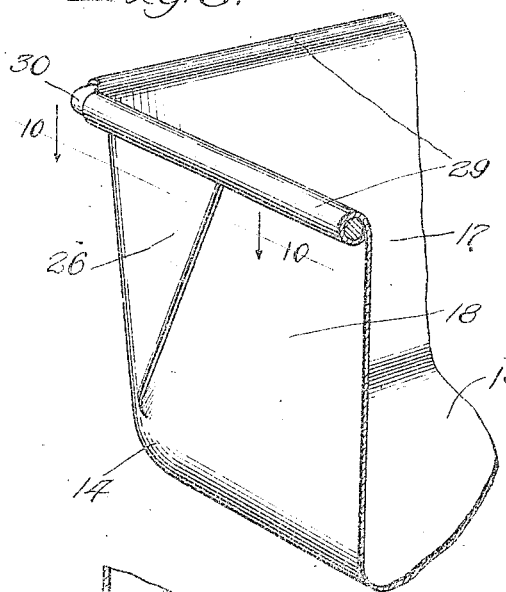
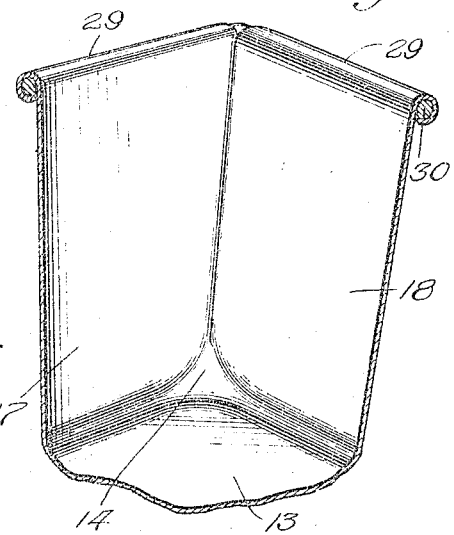
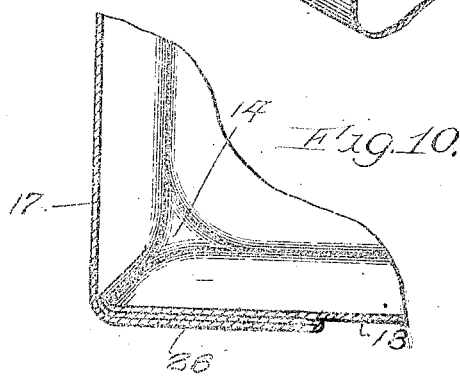
Inventor,
Louis H. Debs,
By Dyrenforth, Lee, Chritton & Wiles
Attys Patented Dec. 12, 1922.

1,438,698

UNITED STATES PATENT OFFICE.

LOUIS H. DEBS, OF CHICAGO, ILLINOIS, ASSIGNOR OF ONE-HALF TO ALBERT COHN, OF CHICAGO, ILLINOIS.

PAN AND METHOD OF MAKING THE SAME.

Application filed October 4, 1921. Serial No. 505,279.

*To all whom it may concern:*

Be it known that I, LOUIS H. DEBS, a citizen of the United States, residing at 544 W. 35th Street, Chicago, in the county of Cook and State of Illinois, have invented a new and useful Improvement in Pans and Methods of Making the Same, of which the following is a specification.

This invention relates to improvements in pans and method of making the same and more especially to a pan, such as a baking pan, adapted to be made from a flat sheet or blank of metal, and having seamless rounded bottom corners free from folds or creases. Such rounded corners are very desirable in pans, such as baking pans and the like, and have many advantages. For example, they make the pan sanitary, permit it to be easily cleaned, and also strengthen it and make it more durable.

Figure 2:
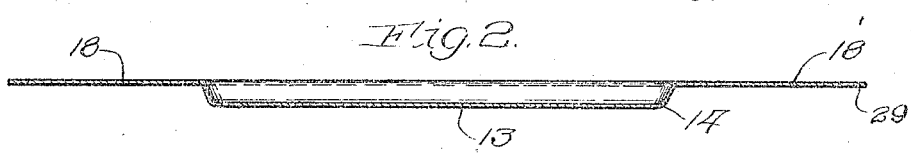
Figure 3:
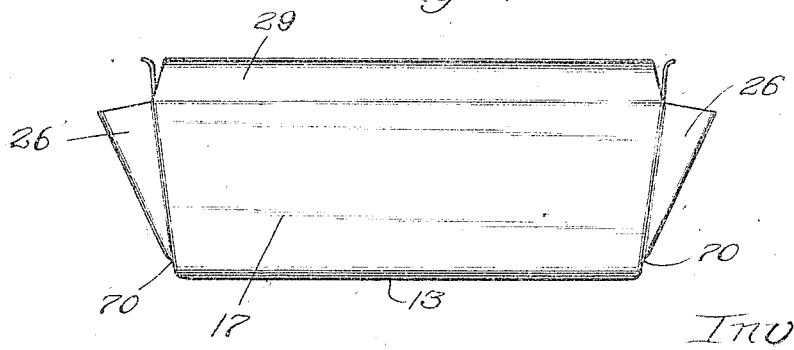
Figure 4:
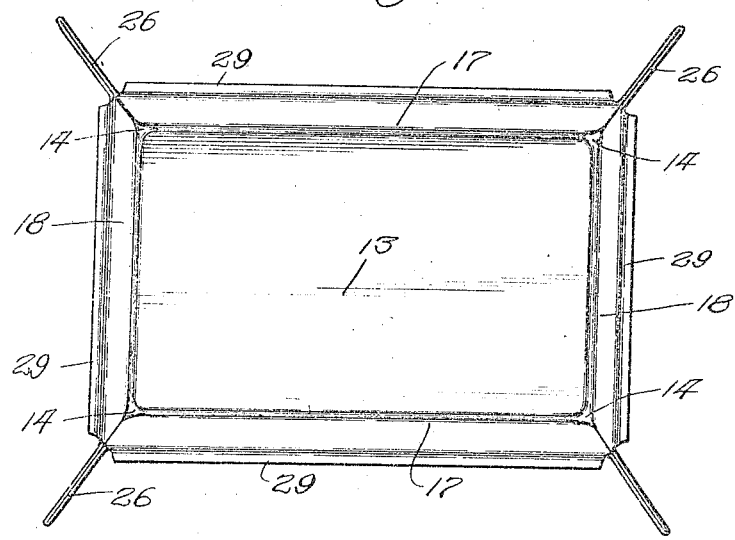

My invention will be fully understood from the following specification, together with the accompanying drawings, in which is shown a form of device embodying the features of my invention. In such drawings, Fig. 1 is a view of the blank from which the pan is made, showing the same after the first step of the process or method of making the pan has been performed, Fig. 2 is a view taken as indicated by the line 2—2 of Fig. 1, Fig. 3 is a view in side elevation showing the pan after the second step in the process or method of making has been performed, Fig. 4 is a top plan view showing the device of Fig. 3, Fig. 5 is a bottom plan view showing the pan after the next step in the process of making has been performed, Fig. 6 is a view in end elevation of the device shown in Fig. 5, Fig. 7 is a top plan view of the completed pan, Fig. 8 is an enlarged view in perspective showing one corner of the completed pan, Fig. 9 is an enlarged view in perspective of the inside of one corner of the completed pan, and Fig. 10 is a view taken as indicated by the line 10—10 of Fig. 8.

As shown in the drawings, 12 indicates a blank cut from sheet metal from which the pan is formed. At the same time that this blank is cut in the shape shown, a rectangular shaped depression as indicated by 13 is drawn, formed or pressed downwardly in the center by suitable dies. It is obvious, however, that, without detracting from the spirit of this invention, the blank can be cut in the requisite shape and the rectangular depression made by separate operations. The corners of the depression 13 as indicated by 14 are rounded as shown to form concavo-convex rounded corners. The depression 13 forms the bottom of the pan, and the rounded corners 14 after being formed by suitable pressing with properly shaped dies, remain during the rest of the steps in the process of making the pan. Such rounded corners are clearly shown in Figures 8, 9 and 10, which illustrate corners of the completed pan.

Figure 1:
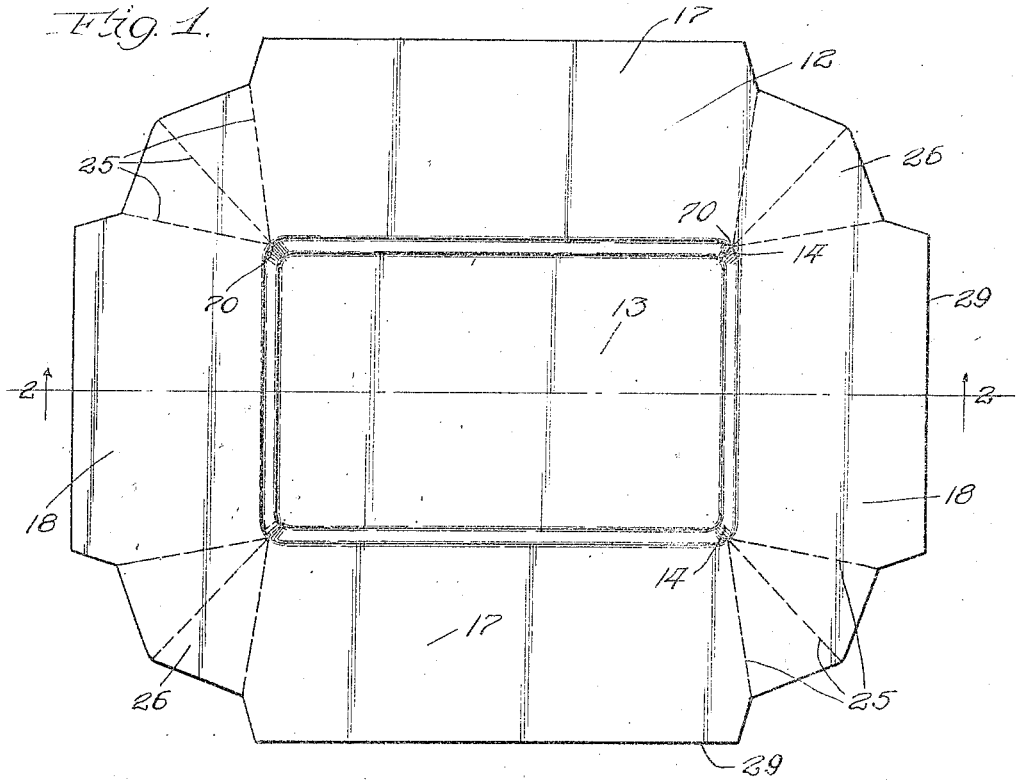

After the blank has been cut and the depression 13 drawn or formed, the sides 17 and ends 18 of the pan are bent upwardly along the upper edge of the sides of said depression by any desired means, as with dies and press to substantially vertical positions, the corners of the blank being folded on the dotted lines 25 shown in Fig. 1, to form the double corners 26 which are permitted to project outwardly as the sides and ends are bent upwardly. It will be noted that the folds on the lines 25 do not extend to the very bottom of the pan, but only to the upper edge of the sides of the depression 13. I have indicated the lower ends of such creases by the reference numeral 70, and it will be seen that such lower ends are considerably above the very bottom of the pan. It will be seen, therefore, that the rounded corners 14 at the bottom of the pan do not have any creases or folds, but are round, smooth, and seamless. After this step in the process of making, the pan is as shown in Fig. 3.

Figure 5:
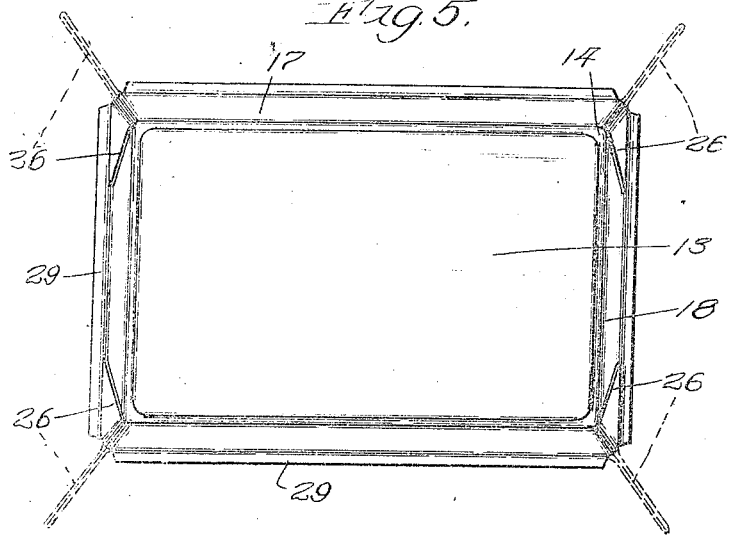
Figure 6:
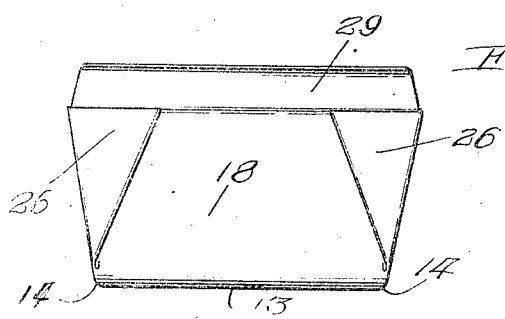

The double or two-ply projecting corner flaps 26 are then folded against the ends of the pan as shown in Fig. 5.

The upper edges 29 of the pan are then bent outwardly and downwardly around a rectangular wire frame 30 in order to round and strengthen the upper edge of the pan.

It will be noted that since the creases at the corners do not go to the very bottom of the pan, they may be more tightly closed, and the adjacent layers of metal more tightly pressed together, thus doing away with the cracks or crevices in which dirt could collect.

Although, I have shown and described certain embodiments of my invention it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A pan formed from a flat sheet of metal having a downwardly depressed drawn bottom with rounded corners; and the sides and ends folded upwardly to form creases at the corners extending only to the upper edge of the sides of the drawn bottom.

2. A pan formed from a flat sheet of material having a downwardly depressed drawn bottom with rounded corners; and sides and ends formed above the upper edge of the sides of the depressed bottom by upwardly bent material.

3. A pan formed from a flat sheet of material having a bottom formed from a relatively shallow depression down in the blank; and having sides and ends above the upper edge of the sides of said depression formed by upwardly bent material.

4. A pan formed from a flat sheet of material having a bottom formed by a relatively shallow depression drawn in the material; and sides and ends formed above the upper edge of the sides of said depression by upwardly folded material.

5. A pan formed from a flat sheet of material having a bottom formed by a relatively shallow depression drawn in the material; and sides and ends formed above the upper edge of the sides of said depression by upwardly folded material to form creases at the corners, said creases extending downwardly only to the upper edge of the sides of said bottom forming depression.

6. The method of making a pan from a flat sheet of material comprising the forming of a bottom with rounded corners by drawing a relatively shallow depression in the material; and forming the sides and ends of the pan by bending the material upwardly from the upper edge of the sides of said depression.

7. The method of making a pan from a flat sheet of material comprising the forming of a bottom with rounded corners by drawing a relatively shallow depression in the material; forming the sides and ends of the pan by bending the material upwardly from the upper edge of the sides of said depression and creasing the same at the corners.

8. The method of making a pan from a flat sheet of material comprising the forming of a bottom with rounded corners by drawing a relatively shallow depression in the material; bending the material outside of said depression upwardly along the upper edges of the sides of said depression to form the sides and ends of the pan, and folding the same at the corners on lines extending downward only to the upper edge of the sides of said depression.

In testimony whereof I have hereunto set my hand and seal this 30 day of September, 1921.

LOUIS H. DEBS.